United States Patent [19]
Kreitz

[11] 4,106,381
[45] Aug. 15, 1978

[54] EXTENSION TABLE FOR TABLE SAWS

[76] Inventor: Lloyd D. Kreitz, P.O. Box 60, Pequot Lakes, Minn. 56472

[21] Appl. No.: 824,913

[22] Filed: Aug. 15, 1977

[51] Int. Cl.$^2$ .............................................. B27B 5/22
[52] U.S. Cl. ................................. 83/477.2; 83/648; 83/859; 83/701
[58] Field of Search .............. 83/477.2, 478, 648, 83/701, 859, 860, 701; 144/286 R

[56] References Cited

U.S. PATENT DOCUMENTS

| | | | |
|---|---|---|---|
| 1,979,773 | 11/1934 | Ritch | 144/286 R |
| 2,555,217 | 5/1951 | Young | 144/286 R |
| 3,342,226 | 9/1967 | Marcoux et al. | 83/478 X |
| 3,595,115 | 7/1971 | Peletier | 83/701 X |

FOREIGN PATENT DOCUMENTS

| | | | |
|---|---|---|---|
| 763,280 | 12/1956 | United Kingdom | 144/286 |

Primary Examiner—J. M. Meister
Attorney, Agent, or Firm—Richard E. Brink

[57] ABSTRACT

A folding extension table is attached to the discharge end of a table saw to facilitate support of comparatively long workpieces. The extension table is designed to permit miter gauge rods to slide forward without interference. Other features include the manner of attachment, which offers versatility in adapting to a wide variety of saw assembly dimensions and configurations.

12 Claims, 5 Drawing Figures

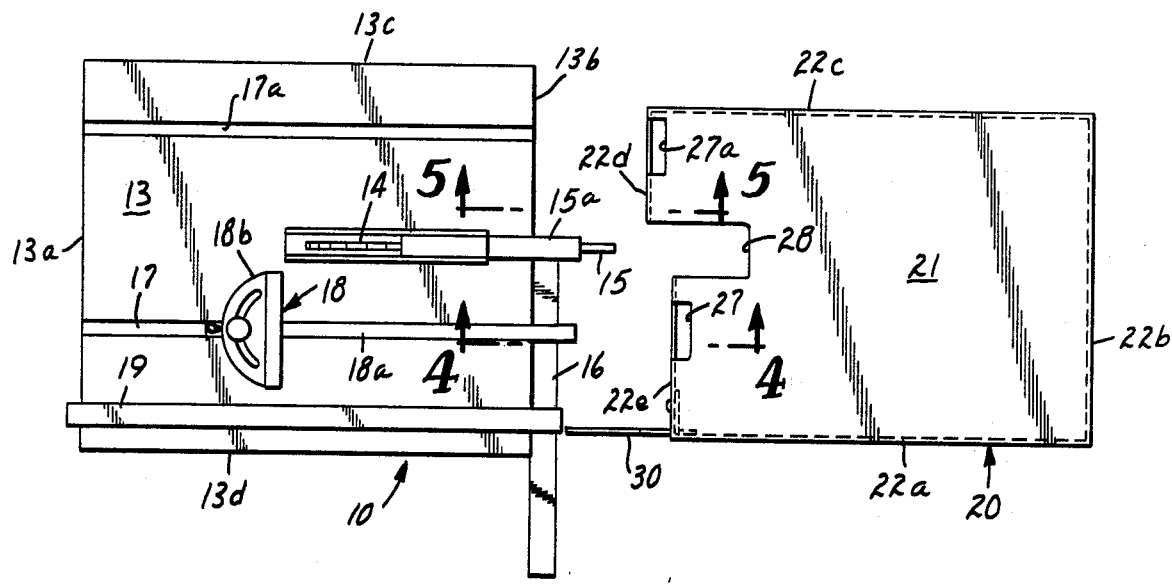
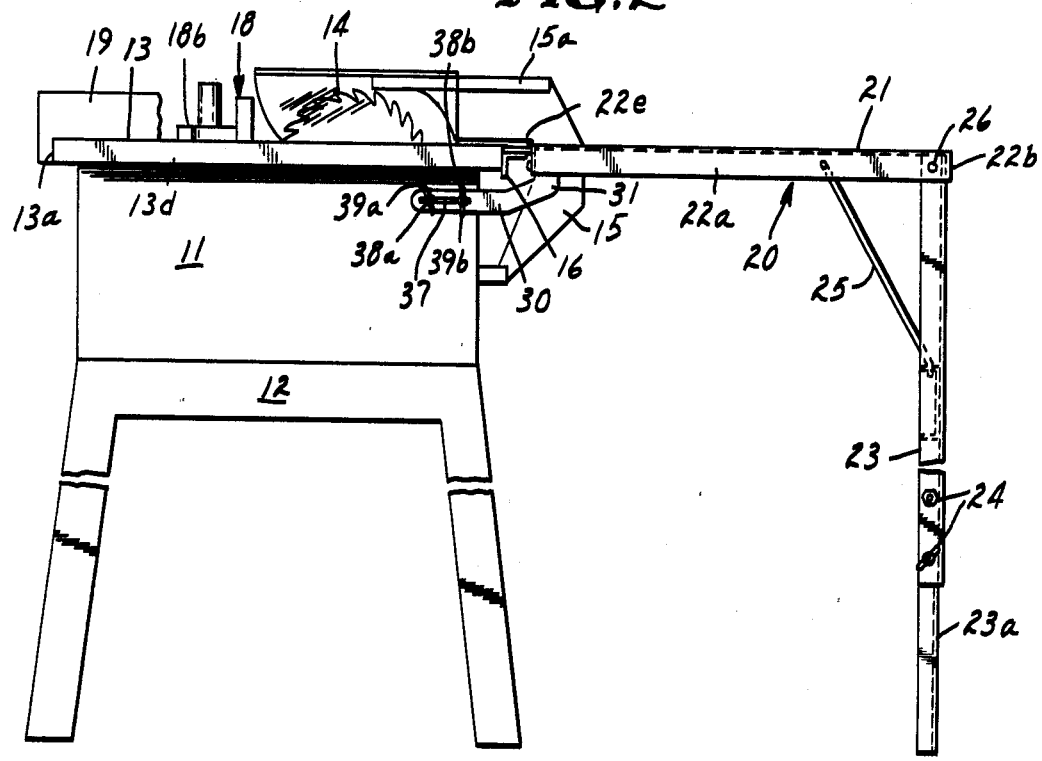
FIG. 2
FIG. 1

4,106,381

EXTENSION TABLE FOR TABLE SAWS

BACKGROUND OF THE INVENTION

This invention relates to workpiece-supporting extensions for power saws, especially table saws.

Table saws have been widely used for many years. In this type of equipment, the workpiece to be sawed is supported by a worktable and moved past a rotating saw blade which extends upwardly through an opening in the top of the worktable. Problems arise whenever the workpiece extends very far beyond the edge of the worktable; not only is such a workpiece hard to hold in position, but the saw cut may also vary from the angle which was intended. Additionally, the situation becomes hazardous to the operator, who may be struck by the workpiece or, even worse, thrown into the saw blade.

To assist in handling oversize workpieces, the manufacturers of table saws have sometimes provided rigid "wings" which can be bolted to the side of the worktable, increasing the area which is available for support. Such wings do not, however, provide any assistance where a cut is being made parallel to the long dimension of a workpiece, e.g., in ripping operations.

One means previously used for supporting long workpieces, especially for ripping operations, is a floor stand having, at its upper end, a yoke in which a workpiece-supporting roller is mounted. This type of support is useful, but it has definite limitations. For example, warped or bowed boards ride poorly on the roller, sag into the area between the saw table and the roller, or both.

Another device for supporting long workpieces is shown in U.S. Pat. No. 2,555,217, where a channel-shaped rail is attached to the discharge end of the saw table and a ladder-like extension is clamped to the rail. While this device may have utility on the equipment shown, it it not suitable for use with most modern table saws, which require that a rip fence be attached at each end of the saw table. A channel rail interferes with such attachment at the discharge end. In the absence of the channel rail, the patentee's extension clamps would presumably have to straddle the discharge edge of the table, interfering with movement of workpieces over the table top.

Prior to the present invention, it is believed that there has never existed a simple extension table suitable for attachment to the discharge end of a saw table without interfering with the normal functions of the saw assembly.

SUMMARY

The present invention provides a simple, inexpensive and convenient extension table which can be attached to all known modern table saw assemblies without interfering with the normal use to which such assemblies may be put. The rip fence may be positioned in any of its conventional locations, and miter gauges, which are normally installed in grooves running lengthwise of the saw table, may be moved along the table as desired.

The invention provides table saw assemblies with an extension table which is readily attached and removed. Folding legs are attached to the end of the extension which is distal to the saw table, thereby facilitating storage when the extension is not required. The extension is appropriately shaped to permit the table saw to be used for all conventional purposes. Novel means are provided for attaching the extension table to the saw table, the abutting edges being clamped at one side and the extension table being connected to the saw housing at the other side.

BRIEF DESCRIPTION OF THE DRAWING

Understanding of the invention will be facilitated by reference to the accompanying drawings, in which like numbers refer to like parts in the several views, and in which:

FIG. 1 is a right side elevation view showing an extension table of the invention attached to a conventional table saw assembly;

FIG. 2 is a top view corresponding to FIG. 1 but showing the saw table and extension table juxtaposed prior to attachment to each other;

DESCRIPTION OF PRESENTLY PREFERRED EMBODIMENT

Figure 4:
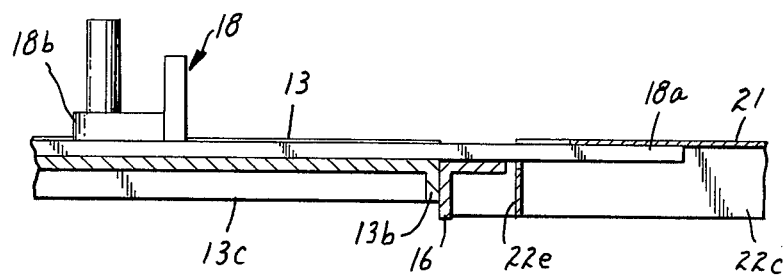
FIG. 4 is a view taken along section line 4 — 4 of FIG. 2, looking in the direction of the arrows, but with the extension table connected to the saw table assembly, showing the manner in which the extension table permits normal use of miter gauges.
Figure 5:
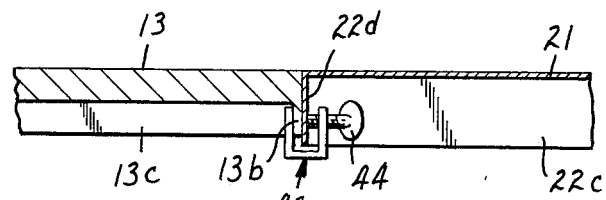
FIG. 5 is a view corresponding to the arrangement shown in FIG. 4, taken along section line 5 — 5 of FIG. 2, looking in the direction of the arrows and indicating the operation of one of the means for connecting the extension table to the saw table assembly.

To enhance understanding of the invention, the drawings will now be explained in greater detail. It should be recognized that the device shown is illustrative rather than limitative and that numerous changes can be made without departing from the spirit of the invention.

In the drawings, conventional table saw assembly 10 comprises saw housing 11 and base 12, the latter being positioned on the floor. At the top of housing 11 is horizontally disposed saw table top 13, which is generally rectangular, having a feed end 13a, a discharge end 13b, left side 13c, and right side 13d, from each of which ends and sides a corresponding lip depends. Positioned within housing 11 is a shaft (not shown) on which saw blade 14 is mounted. Located below the top of table 13, and extending beyond discharge end 13b, is support 15, to which saw guard 15a hingedly connected. Saw blade 14 protrudes through an elongate opening in the top of table 14, means (not shown) being provided to cant blade 14 to the right and left of its usual position normal to the top of table 13.

Connected to discharge end 13b of saw table assembly 10 is rip fence attachment rail 16, the forward end of rip fence 19 being connected to rail 16 and the rear end being connected to feed end 13a of table 13 during conventional ripping operations; rip fence 19 is positioned at the desired location to the right or left of saw blade 14 and clamped in place. (In other types of conventional table saws, rail 10 may be omitted, the forward end of rip fence 14 then attaching directly to lip 13b of table 13.) Rip fence 19 may, of course, be removed entirely for crosscut or mitering operations.

Recessed in the surface of saw table top 13 are channels 17 and 17a, in which miter gauge 18 may be positioned. Miter gauge 18 includes rod 18a, which slides smoothly within channel 17 or 17a, and guide 18b, which is pre-set at a desired angle to rod 18a. During the crosscut or mitering operation, guide 18b is forced against the workpiece to urge it into contact with saw blade 14, rod 18a typically moving well beyond discharge end 13b of table 13 during the cutting operation.

All of the foregoing description relates to normal operations involving a typical table saw assembly and is set forth only to facilitate understanding of how the extension table of the invention cooperates smoothly therewith. In the preceding and subsequent description, the terms "left" and "right" are determined from the viewpoint of an operator standing at the feed end 13a of table saw assembly 10.

Extension table 20 comprises substantially flat and generally rectangular panel 21, lips 22a, 22b, and 22c depending respectively from the right, distal and left edges thereof to assist in rigidifying and stabilizing. The proximal end of panel 21, which is irregular in construction for reasons to be disclosed more fully later in this description, is provided with depending lip 22d at the left portion and depending lip 22e at the right portion. Positioned at the distal end of panel 21 is a pair of supporting legs 23, to which extensions 23a are connected by means of wing nut assemblies 24 to permit adjusting the height of extension table 20 above the floor and render the upper surface of panel 21 substantially coplanar with the upper surface of saw table top 13. The upper ends of legs 24 are pivotally connected to the distal end of lips 22a and 22c, e.g., by means of rivets 26, to permit legs 24 to be folded under panel 21 when extension table 20 is not in use. So that legs 24 may be held firmly in position when table 20 is in use, brace 25 is conveniently employed.

As has been previously pointed out, miter gauge rod 18a is moved along groove 17 during normal crosscutting operations, so that it extends beyond the discharge end 13b of saw table top 13. In order to provide clearance for rod 18a when extension table 20 is attached to saw 13, portions of lips 22d are removed. It has been found that such clearance is further facilitated if a small amount 27, 27a of adjoining panel 21 is also removed. Alternatively, the top of panel 21 could be grooved or depressed slightly to accommodate rod 18a.

It has likewise been pointed out that support 15 and attached saw guard 15a protrude beyond discharge end 13b of table top 13. In order to accommodate this protrusion, portion 28 of panel 21 is removed, thereby permitting the smooth abutment of lip 13b and lip 22d.

Most conventional table saws incorporate some type of rail 16 for rip fence 19; rail 16, which extends to the left or right from approximately the location of saw blade 14, typically has the rectangular cross-section of an angle iron, extending beyond discharge end 13b and providing a means for "clamping in" the forward end of rip fence 10. Because rail 16 usually protrudes beyond discharge end 13b, it is impossible to abut lip 22e of extension table 20 against the lip at discharge end 13b. Accordingly, the proximal end of panel 21 is foreshortened in this area to permit lip 22e to approach but not quite abut the forward end of rail 16.

When saw assembly 10 and extension table 20 are to be connected together, legs 24 are first extended and locked in an upright position. Proximal lip 22d is then abutted against the lip of table 13 at discharge end 13b and the tops aligned in substantial coplanarity. These two lips are then clamped together, e.g., by straddling them with channel-shaped member 40. One side of member 40 is provided with drilled and tapped holes 41, 42, into which complementarily threaded thumb screws 43, 44 are inserted and tightened snugly.

Figure 3:
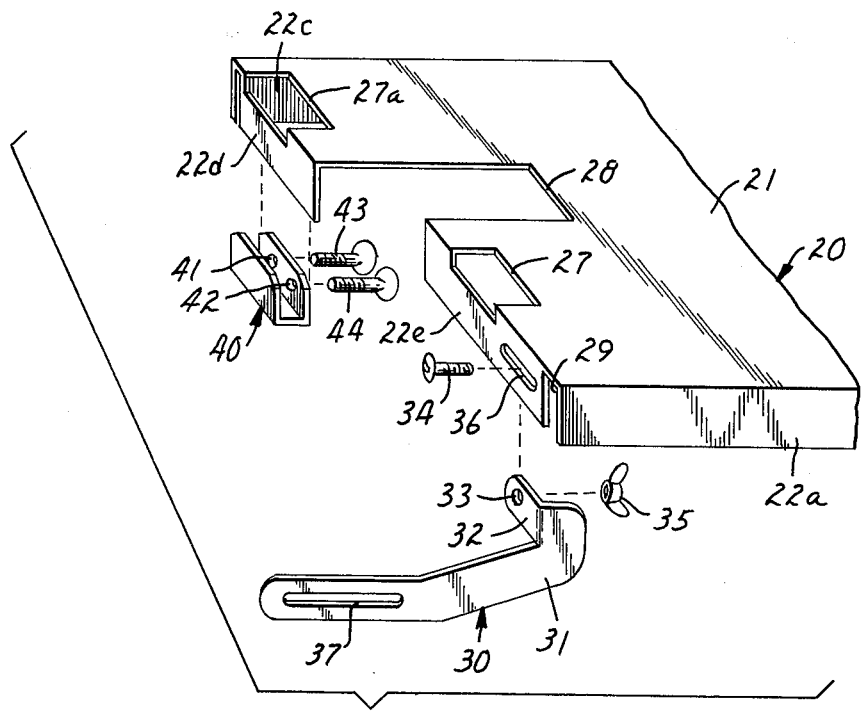
FIG. 3 is a perspective view of the portion of the extension table which is proximal to the saw table, depicting, in exploded manner, the means which serve to connect the extension table to the saw table assembly.

As noted, the right side of proximal lip 22e does not come into contact with the corresponding lip of saw table 13, being spaced slightly therefrom to permit positioning rip fence 19 at any desired location along rail 16. To connect the right side of extension table 20 to saw table assembly 10, it has been found convenient to employ a strap 30, which is connected at one end to the proximal end of extension table 20 and at the other end to the right side of saw housing 11. One effective form of strap is shown in the drawings, the details being most easily seen in FIGS. 1 and 3. Strap 30 comprises an elongated body portion 31 and a tab 32 bent at right angles thereto at one end. Hole 33 is provided in tab 32, and a horizontally elongated slot 36 is provided in lip 22e. Bolt 34 is then inserted through slot 36 and hold 34, after which wing nut 35 is threaded on. Slot 36 permits lateral adjustment of strap 30 to accommodate various widths of saw housing 11.

To complete the connection of the right side of extension table 20, the end of body portion 31 which is distal to tab 32 is provided with elongated slot 37. A pair of bolts 38a, 38b are then inserted from the inside of housing 11, through holes drilled in the right side thereof, and slot 37 slipped thereover. Wing nuts 39a 39b are then threaded onto bolts 38a, 38b, strap 30 moved to the desired location, and wing nuts 39a, 39b tightened.

Because it is considered desirable to position lip 22e as close as possible to rail 16, it is preferred that tab 32 be mounted on the inside of lip 22e. In order to permit passage of body portion 31, it then becomes desirable to remove a small portion of lip 22, thereby providing an opening 29.

What I claim is as follows:

1. In combination with a power saw assembly which comprises a saw housing supported a desired distance above the floor; mounted above said housing a generally rectangular horizontal worktable having a feed end, a discharge end, right and left sides, and peripherally depending lips; said worktable having a centrally located elongate opening to accommodate a rotary saw blade; at least one groove located in the top of said worktable extending parallel to both sides and shaped to accommodate a miter gauge rod; located at the ends of said worktable, means for positioning a rip fence parallel to said sides; a rotary saw blade positioned within said housing beneath said worktable and movable through said opening; means for rotating said blade; positioned beneath said worktable and extending beyond the discharge end, a support; and a saw guard hingedly connected to said support;

a generally rectangular, flat-topped extension table comprising an elongate flat panel having two sides, a distal end, and a proximal end, lips depending from said sides and ends to enhance rigidity;

support means connected to the distal portion of said extension table to position said distal end a predetermined distance above the floor, said distance corresponding to the height of the worktable above the floor;

first means attaching the proximal lip adjacent one side of said extension table to the lip at the discharge end of said worktable, thereby aligning the upper surfaces of said tables; and second means attaching the proximal lip adjacent the other side of said extension table to said saw housing.

2. The combination of claim 1 wherein a portion of the proximal lip and ajoining panel of the extension table is absent, thereby facilitating rotation of the saw guard and support as the saw blade is canted.

3. The combination of claim 2 wherein a portion of the proximal lip of said extension table is absent in the area which abuts each miter gauge rod groove, thereby permitting said rod to slide beneath the top of said extension table.

4. The combination of claim 2 wherein the first attaching means is a channel-shaped member, one side of said member being drilled and tapped to accommodate screws to force the discharge lip of the worktable and the proximal lip of the extension table into firmly abutting contact.

5. The combination of claim 4 wherein the second attaching means is a rigid strap connected at one end to the proximal lip of the extension table and at the other end to the saw housing.

6. The combination of claim 5 wherein the end of the strap which connects to the extension table is provided with a tab bent at right angles to the main body of the strap, the tab and the proximal lip of the extension table being joined together.

7. The combination of claim 6 wherein the proximal lip of the extension table is provided with a horizontal slot to permit positioning the strap laterally, so as to facilitate attachment to saw housings of various widths.

8. The combination of claim 7 wherein the tab is positioned under the extension table, a portion of the distal lip of said extension table being absent to permit passage of the main body of the strap.

9. The combination of claim 8 wherein the end of the main body of the strap, distal to said tab, is provided with an elongate slot to facilitate attachment to saw housings of various depths.

10. The combination of claim 5 wherein the power saw assembly includes a rip fence rail mounted beyond and slightly below the upper surface of the discharge end of said worktable, the proximal end of the extension table being foreshortened in the area occupied by said rail.

11. The combination of claim 5 wherein the support means for the extension table comprises a pair of legs which are pivotally connected to the lips at the two sides of said extension table adjacent the distal end thereof.

12. The combination of claim 11 wherein the length of the legs is adjustable.

* * * * *